(12) United States Patent
Tamura et al.

(10) Patent No.: US 6,600,576 B2
(45) Date of Patent: *Jul. 29, 2003

(54) FACSIMILE APPARATUS

(75) Inventors: Harumichi Tamura, Nara (JP);
Toshiya Miura, Kyoto (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/120,579

(22) Filed: Jul. 22, 1998

(65) Prior Publication Data

US 2002/0089703 A1 Jul. 11, 2002

(30) Foreign Application Priority Data

Sep. 9, 1997 (JP) ............................... 9-244081

(51) Int. Cl.[7] .............................................. H04N 1/00
(52) U.S. Cl. ...................... 358/440; 358/474; 358/478
(58) Field of Search .............................. 358/474, 478, 358/479, 497, 494, 400, 442; 382/313, 314, 317

(56) References Cited

U.S. PATENT DOCUMENTS

| | | | | |
|---|---|---|---|---|
| 4,962,526 A | * | 10/1990 | Kotani et al. ............... 379/100 |
| 5,172,243 A | * | 12/1992 | Hayashi et al. ............. 358/400 |
| 5,402,251 A | * | 3/1995 | Ogasaeara et al. .......... 358/473 |
| 5,418,630 A | * | 5/1995 | Mori et al. .................. 358/472 |
| 5,550,938 A | * | 8/1996 | Hayakawa et al. ......... 382/313 |
| 5,854,694 A | * | 12/1998 | Payne et al. ................ 358/473 |
| 6,020,971 A | * | 2/2000 | Kato et al. .................. 358/1.14 |

FOREIGN PATENT DOCUMENTS

JP          5-91251          4/1993

* cited by examiner

*Primary Examiner*—Thomas D. Lee
(74) *Attorney, Agent, or Firm*—Edwards & Angell, LLP; David G. Conlin; David A. Tucker

(57) ABSTRACT

In a facsimile apparatus including numeric keys for entering dial numbers or abbreviated dial numbers, a transmission instruction key for instructing the processing for transmission, a storage unit for storing dial information and received information, a scanner which is removable from a main body of the apparatus having a reading and storing units, a scanner connecting unit for connecting said scanner to the main body of the apparatus and a printing unit for visually outputting an image data which is stored in said storing unit, the image data which is stored in the storing unit of the scanner is output only by mounting said scanner on a main body of the apparatus.

16 Claims, 14 Drawing Sheets

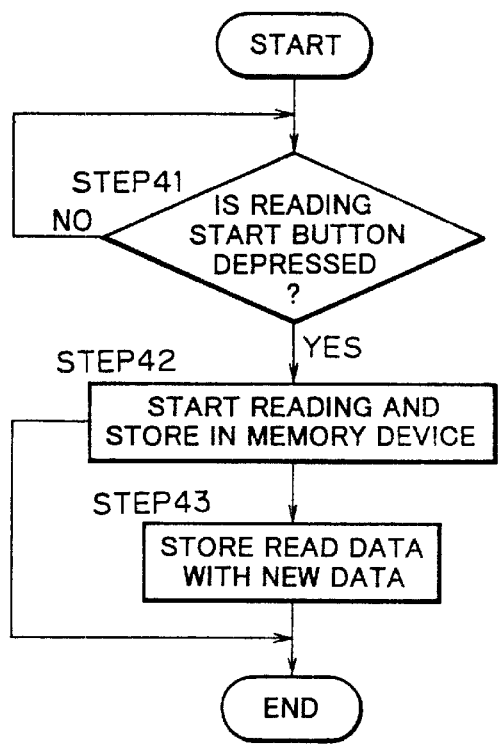
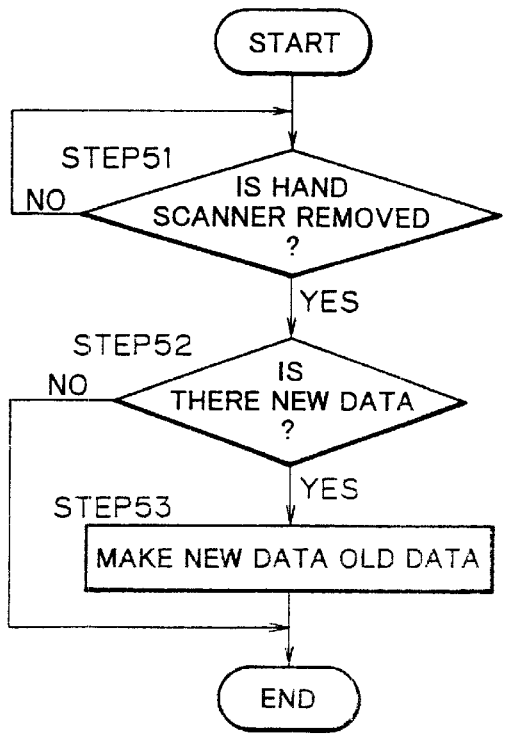

FIG.7

| COMMAND DATA | PARAMETER 1 | PARAMETER 2 | CONTENT OF COMMAND |
|---|---|---|---|
| 00 | 00 | 00 | CONNECTION CONFIRMATION COMMAND |
| 01 | 00 | 00 | IMAGE INFORMATION REQUEST |
| 02 | FRAME NUMBER OF OUTPUT IMAGE DATA | 00 | IMAGE DATA OUTPUT REQUEST |
| 03 | 00 | 00 | PROCESSING STATE CONFIRMATION COMMAND |

FIG.8

| COMMAND DATA | PARAMETER 1 | PARAMETER 2 | CONTENT OF COMMAND |
|---|---|---|---|
| 00 | 00 | 00 | CONNECTION CONFIRMATION COMMAND |
| 01 | NUMBER OF FRAMES OF ALL IMAGES | NUMBER OF FRAMES OF NEW IMAGE DATA | IMAGE INFORMATION TRANSMISSION |
| 02 | AMOUNT OF IMAGE DATA | | IMAGE DATA OUTPUT REQUEST |
| 03 | 00 NOT PROCESSING<br>01 PROCESSING | 00 | PROCESSING STATE CONFIRMATION COMMAND |

FIG.14
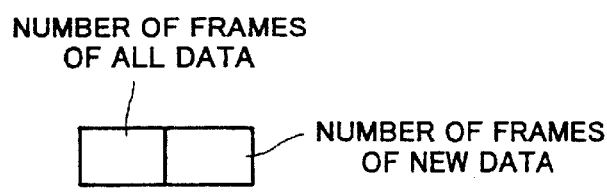
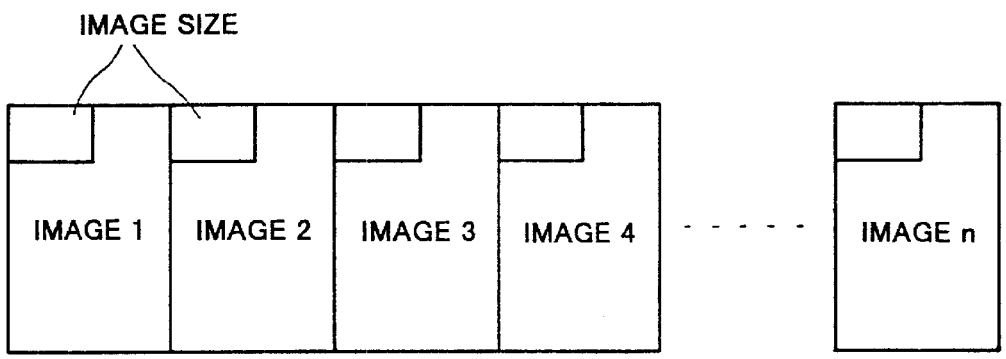
FIG.15
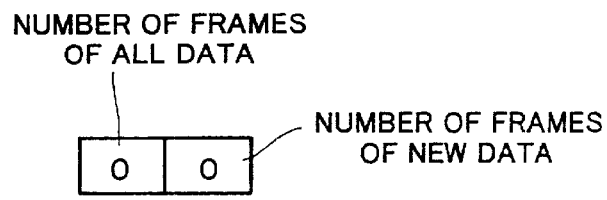
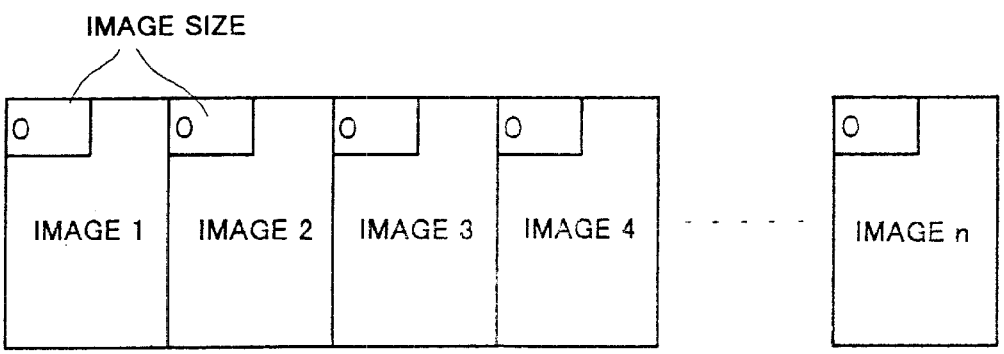

FIG.16
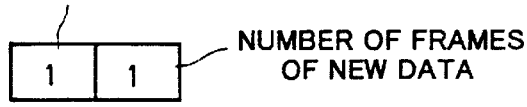
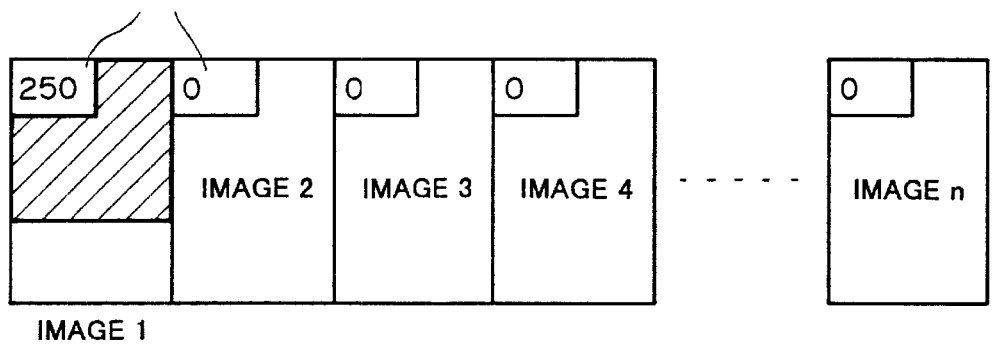
FIG.17
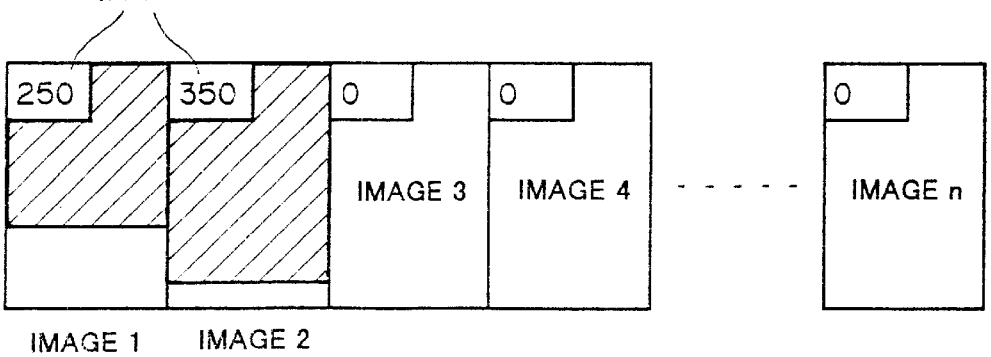

FIG.18
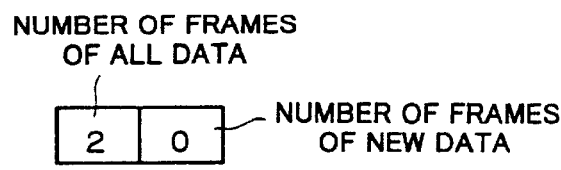
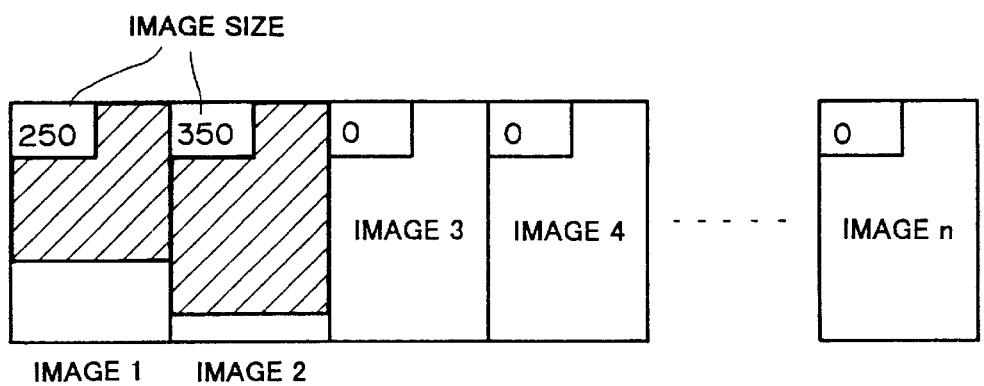
FIG.19
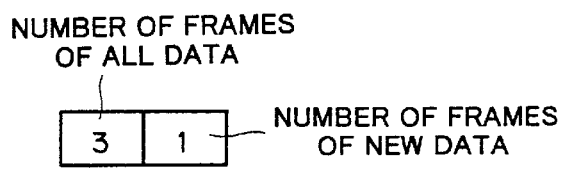
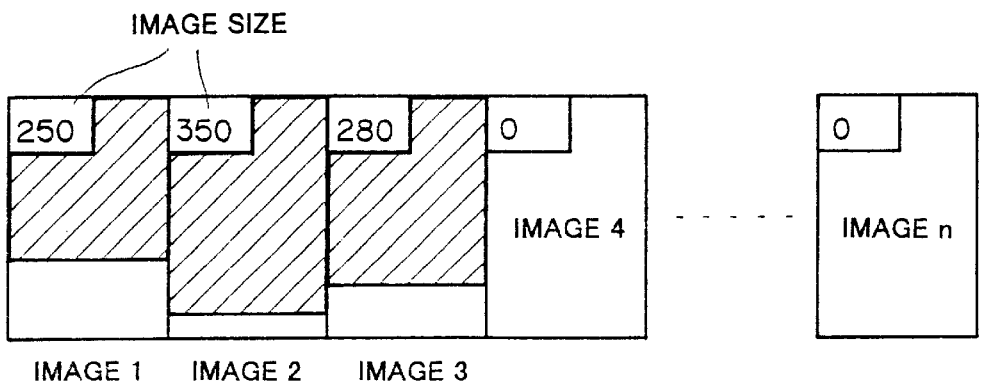

FACSIMILE APPARATUS

BACKGROUND OF THE INVENTION

1. Field of the Invention

The present invention relates to a facsimile apparatus, and in particular to a facsimile apparatus in which a scanner unit having an image reading unit is removable from a main body of the apparatus.

2. Description of the Related Art

In prior art facsimile apparatus having a removable hand scanner, a predetermined image number must be specified and a printing start button must be depressed when an operator desires to print the image data which is stored in the hand scanner unit. This operation takes much time for the operator.

Similar technique is disclosed in Japanese Laid-Open Patent Publication (Tokkai Hei) No. 5-91251. Copying operation is carried out only when a copy mode is preliminary preset on the side of the hand scanner and the stored image data is not transmitted.

However, the above-mentioned prior art can not cope with the mode of operation which the operator desires to use most frequently.

In other words, modes of operation of the hand scanner of the usual facsimile apparatus which the operator most frequently uses includes a mode in which just read image data is immediately printed or transmitted. In the prior art, the operation to select any of printing or transmission mode is complicated and time consuming.

Therefore, it is an object of the present invention to provide a facsimile apparatus which enables an operator to easily print or transmit the content of the memory in a hand scanner.

SUMMARY OF THE INVENTION

A facsimile apparatus of the present invention including numeric keys for entering dial numbers or abbreviated dial numbers, a transmission instruction key for instructing the processing for transmission, a storage unit for storing dial information and received information, a scanner which is removable from a main body of the apparatus having a reading and storing units, a scanner connecting unit for connecting said scanner to the main body of the apparatus and a printing unit for visually outputting an image data which is stored in said storing unit, is characterized in that the image data which is stored in the storing unit of the scanner is output only by mounting said scanner on a main body of the apparatus.

A facsimile apparatus in accordance with the preceding paragraph is characterized in that the output image data is that obtained since the scanner is removed from the main body of the apparatus until it is mounted thereon.

A facsimile apparatus of the present invention including numeric keys for entering dial numbers or abbreviated dial numbers, a transmission instruction key for instructing the processing for transmission, a storage unit for storing dial information and received information, a scanner which is removable from a main body of the apparatus having a reading and storing units, a scanner connecting unit for connecting said scanner to the main body of the apparatus and a printing unit for visually outputting an image data which is stored in said storing unit, is characterized in that reading is terminated by mounting said scanner on the main body of the apparatus even while reading the data by said scanner.

A facsimile apparatus of the present invention including numeric keys for entering dial numbers or abbreviated dial numbers, a transmission instruction key for instructing the processing for transmission, a storage unit for storing dial information and received information, a scanner which is removable from a main body of the apparatus having a reading and storing units, a scanner connecting unit for connecting said scanner to the main body of the apparatus and a printing unit for visually outputting an image data which is stored in said storing unit, is characterized in that the image data which is stored in the storing unit of said scanner is transmitted only by mounting said scanner on the main body of the apparatus.

BRIEF DESCRIPTION OF THE DRAWINGS

FIG. 4 is a flow chart (part 2) showing the operation of the facsimile apparatus of the present invention;

FIG. 5 is a flow chart (part 3) showing the operation of the facsimile apparatus of the present invention;

FIG. 7 is a table showing commands which is transmitted from the main body to the hand scanner (hand copier);

FIG. 8 is a table showing commands which is transmitted from the hand scanner, hand copier to the main body;

FIG. 14 is a diagram showing an exemplary constitution of buffers of the storing device of the hand scanner;

FIG. 15 is a diagram showing the initial state in the case of FIG. 14

FIG. 16 is a diagram showing a state when the first frame of image data is read in the case of FIG. 14;

FIG. 17 is a diagram showing a state when the second frame of image data is read in the case of FIG. 14;

FIG. 18 is a diagram showing a state when the hand scanner is removed from the main body after it has been mounted thereon in the case of FIG. 14; and FIG. 19 is a diagram showing a state when image data is read after the hand scanner is removed from the main body in the case of FIG. 14.

PREFERRED EMBODIMENT OF THE INVENTION

Now, the embodiments of the present invention will be described with reference to FIGS. 1 to 19.

Figure 1:
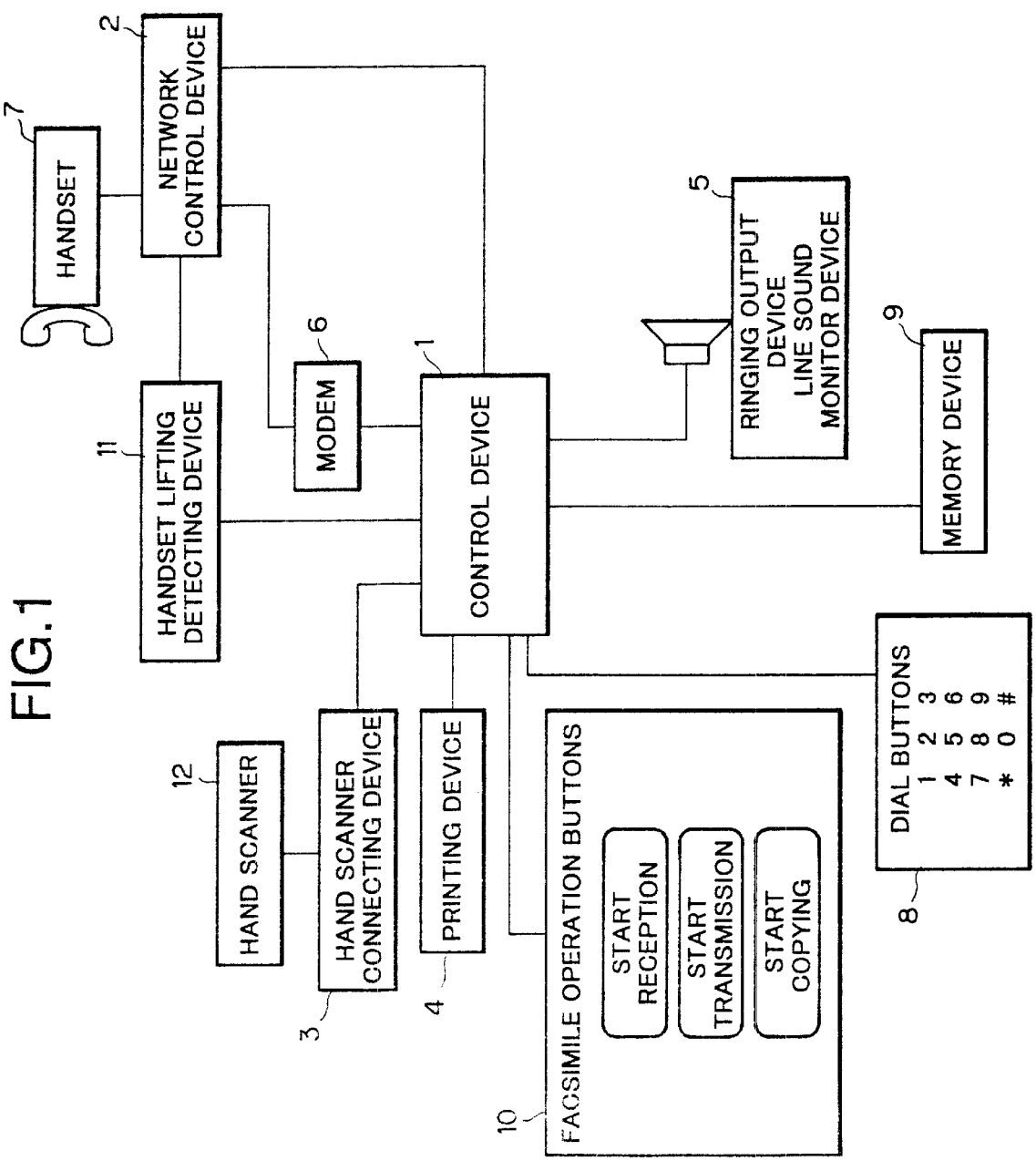
FIG. 1 is a block diagram showing the constitution of the main body of the facsimile apparatus of the present invention.

FIG. 1 is a block diagram showing a main body of the facsimile apparatus of the present invention.

A reference numeral 1 denotes a control device for controlling the whole of the apparatus (including a scanner if it is connected to the main body of the facsimile apparatus).

A reference numeral 2 denotes a network control device for controlling the transmission of data.

A reference numeral 3 denotes a hand scanner connecting device for integrally connecting the scanner with the main body of the apparatus.

A reference numeral 4 denotes a printing device such as thermal head or ink injecting head for visually outputting an image data.

A reference numeral 5 denotes a device for outputting ringing tone (circuit tone monitor device, so called speaker).

A reference numeral 6 denotes a modem for modulating and demodulating analog and digital signal of transmission of data.

A reference numeral 7 denotes a handset.

A reference numeral 8 denotes dial buttons for entering dial numbers, abbreviated dial numbers, etc.

A reference numeral 9 denotes a storage unit for storing dial information (one touch dial number, abbreviated dial numbers, etc.) and received information.

A reference numeral 10 denotes facsimile operation buttons for instructing transmission, reception and copying.

A reference numeral 11 denotes a handset lifting detecting device for detecting on-hook and off-hook of the handset.

A reference numeral 12 denotes a hand scanner having a built-in close contact type reading sensor or reduced optical system and the like.

Figure 2:
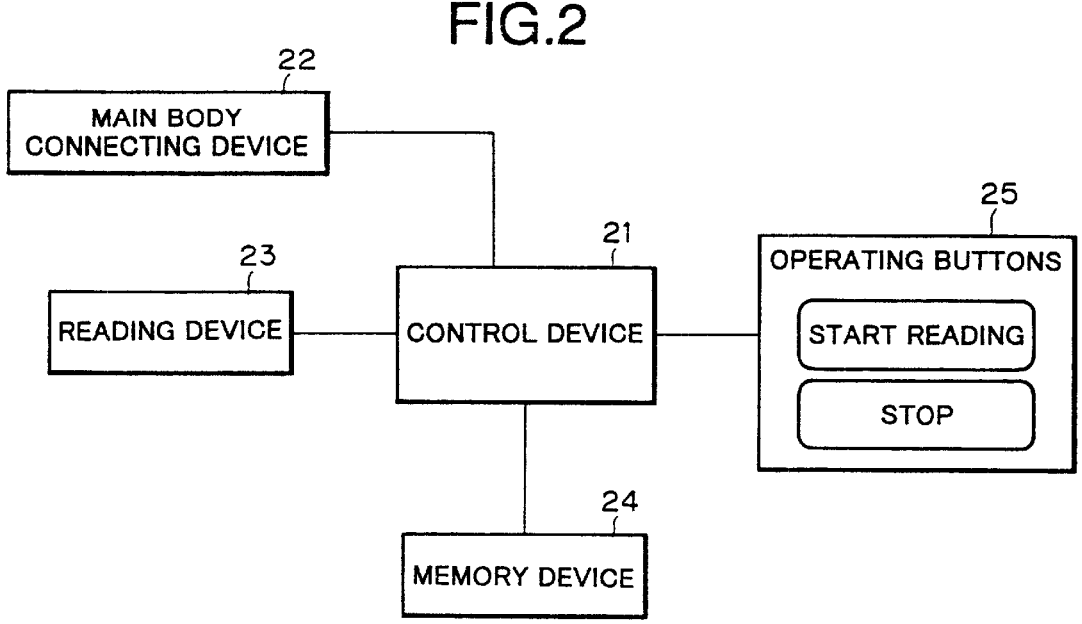
FIG. 2 is a block diagram showing the constitution of the scanner of the facsimile apparatus of the present invention.

FIG. 2 is a block diagram showing the scanner of the facsimile apparatus of the present invention.

A reference numeral 21 denotes a control device for controlling the whole of the hand scanner.

A reference numeral 22 denotes a connecting device for connecting the scanner unit to the main body of the apparatus, which corresponds to the hand scanner connecting device 3.

A reference numeral 23 denotes an image data reading device such as close contact type reading sensor or reduced optical system and the like.

A reference numeral 24 denotes a storing unit for storing an image data which has been read.

A reference numeral 25 denotes operation buttons for instructing starting and ending of reading of the image data.

Figure 3:
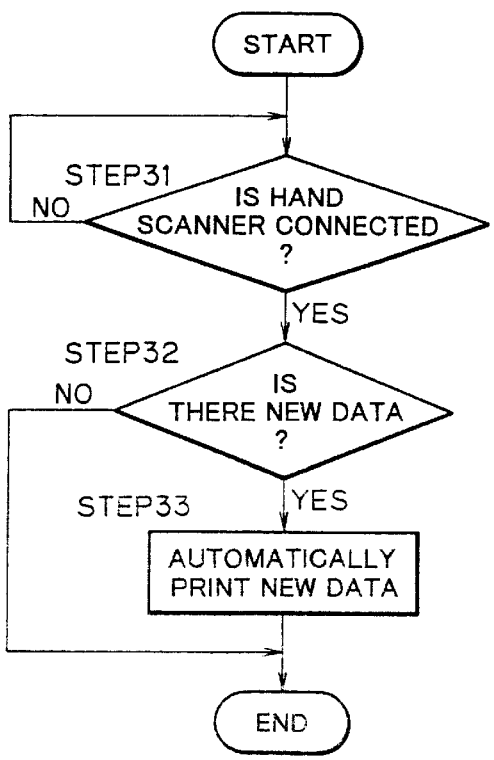
FIG. 3 is a flow chart (part 1) showing the operation of the facsimile apparatus of the present invention.

FIG. 3 is a flow chart showing the operation of the facsimile apparatus when the scanner is mounted on the main body of the facsimile apparatus.

The control device 1 detects that the hand scanner 12 is connected to the hand scanner connecting device 3 (S31).

Subsequently, the control device 1 determines whether or not there is a new image data (S32).

If the number of frames of new image information which is transmitted via the hand scanner connecting device 3 from the hand scanner 12 is 0, the control device 1 causes the facsimile apparatus to be brought into a stand-by mode.

On the other hand, if the number of frames of the new image information which is transmitted via the hand scanner connecting device 3 from the hand scanner 12 is one or more, the control device 1 instructs the printing device 4 to print on a recording paper the image data which is transmitted from the hand scanner 12 via the hand scanner connecting device 3.

Alternatively, transmission can be conducted in lieu of printing operation. In this case, the destination of the transmission may be the numbers of the last called party.

In other words, if data which is failed to be transmitted is found after completion of the transmission, additional data can be transmitted to the just transmitted destination only by reading the image to be transmitted again by means of the hand scanner and mounting the hand scanner on the main body of the apparatus. It is very convenient.

If the hand scanner is mounted on the main body of the apparatus, selection whether printing or transmission of the image data is to be conducted may be preliminarily specified by mode switches. Alternatively, transmission may be conducted only when the hand scanner is removed from the main body for reading data and is mounted on the main body of the apparatus within a predetermined period of time after the transmission of data.

A term "new data" used herein means a stored data since the hand scanner is removed until it is mounted on the main body. Interruption of power to the main body of the apparatus causes the new data to be erased.

If no data is read even if the hand scanner is removed from the main body, the last stored data may be left as new data, or the last stored data may be stored as old data and it may be displayed that there is no new data.

Both new and old data are stored in the storing unit. Ease of use can be enhanced if the operator can select the storage mode such as storing of only new data, only old data or both new and old data after the new data is automatically printed as mentioned above.

Also in this case, operation for transmission processing may be executed in lieu of the operation for printing processing.

A method of managing of the image data may be carried out in the main body of the apparatus although the new data is stored in the hand scanner in this case.

For example, image information which is stored in the hand scanner is transferred to the main body of the apparatus and stored therein when the hand scanner is firstly mounted on the main body of the apparatus.

Then, when the hand scanner is mounted on the main body of the apparatus again after the hand scanner is removed, new data may be determined by comparing image information which is transmitted from the hand scanner and the previous image information which is stored in the main body of the apparatus.

FIG. 4 is a flow chart showing the operation when image reading is conducted by means of the scanner.

The control device 21 determines whether a reading start button of the operation buttons 25 is depressed or not (S41).

When the control device 21 determines that the button is depressed, the control device activates the reading device 23 to store read image data in the storing device 24 (S42).

Simultaneously with this, the control device 1 causes the storing device 24 to store that the stored image data is a new data (S43).

FIG. 5 is a flow chart showing the operation when the scanner is removed from the main body of the apparatus.

The control device 1 determines whether the hand scanner 12 is removed from the main body of the apparatus (S51).

Subsequently, when the control device 1 determines the hand scanner is removed, it determines whether there is new data in the image data stored in the storing device 24 (S52).

If there is new data, the control device 1 rewrites new data as old data for storage so that next read data is stored as new data (S53).

Figure 6:
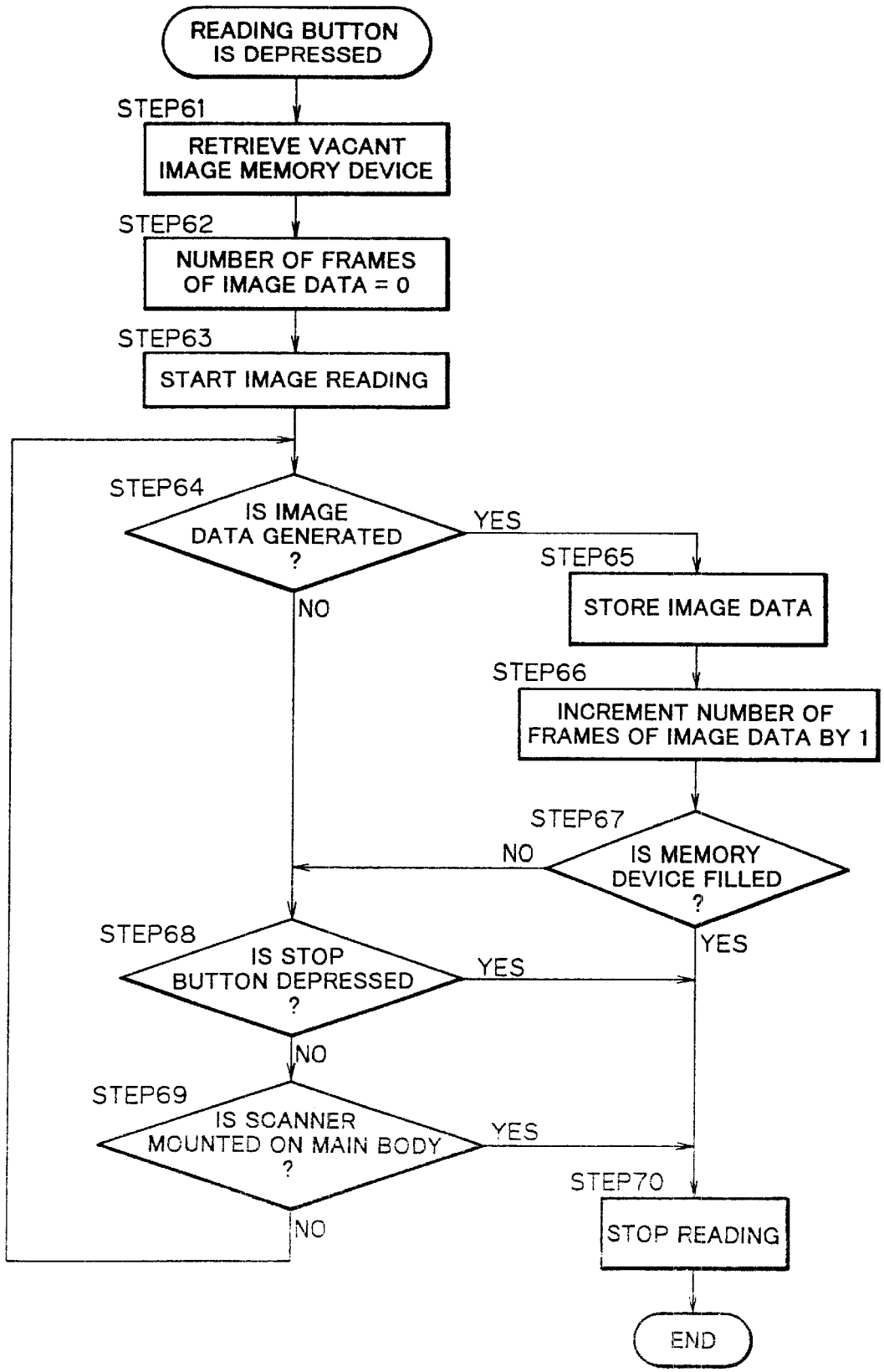
FIG. 6 is a flow chart (part 4) showing the operation of the facsimile apparatus of the present invention.

FIG. 6 is a flow chart showing the operation when the scanner is mounted on the main body of the apparatus while reading is conducted by means of the scanner and when the amount of the image data exceeds the capacity of the storing unit.

When the reading button is depressed, retrieving for vacant image storing device is conducted (S61). The number of frames of image data is preset to 0 (S62). Image reading is started (S63).

The control device 1 determines whether an image data is generated or not (S64). The image data is stored (S65). The number of frames of image data is incremented by one (S66).

The control device 1 determines whether the storing device is filled with data or not (S67). If it determines that it is filled, it stops reading (S70).

If it is not filled, reading is continued. When the control device 1 determines that a stop button is depressed (S68), reading is stopped. If the control device determines that the scanner is mounted on the main body of the apparatus (S69) even when the stop button is not depressed, reading is stopped.

Now, a method of detecting when the scanner (also referred to as hand scanner or hand copier) is connected to the main body of the apparatus in accordance with the present invention will be described.

The hand scanner is connected to the main body of the apparatus via an electric connector. The connector includes a signal line which is formed so that connection of the hand scanner can be detected from the main body of the apparatus, and a signal line which is formed so that connection of the main body of the apparatus can be detected from the hand scanner as well as a signal line which is necessary for the transmission of the information between the hand scanner and the main body of the apparatus.

The main body transmits a connection confirmation command to the hand scanner when the connection of the hand scanner is detected by a hand scanner detecting device in the hand scanner connecting device 3. When the hand scanner receives the connection confirmation command from the main body of the apparatus, the hand scanner transmits the connection confirmation command to the main body of the apparatus. When the main body of the apparatus receives the connection confirmation command from the hand scanner, it confirms that the hand scanner is connected to the main body.

When the main body of the apparatus confirms the connection of the hand scanner, it inquires the hand scanner how many frames of the image are stored in the scanner or how many frames of new data exist.

FIG. 7 is a table showing commands which are transmitted to the hand scanner from the main body of the apparatus. A command comprises three bytes. The first byte is used for identification of a command and second and third bytes are parameters.

FIG. 8 is a table showing commands which are transmitted to the main body of the apparatus from the hand scanner. A command comprises three bytes. The first byte is used for identification of a command and second and third bytes are parameters as is similar to FIG. 7.

Processing sequence of the main body of the apparatus and the hand scanner will be described with reference to FIGS. 9 through 13.

Figure 9:
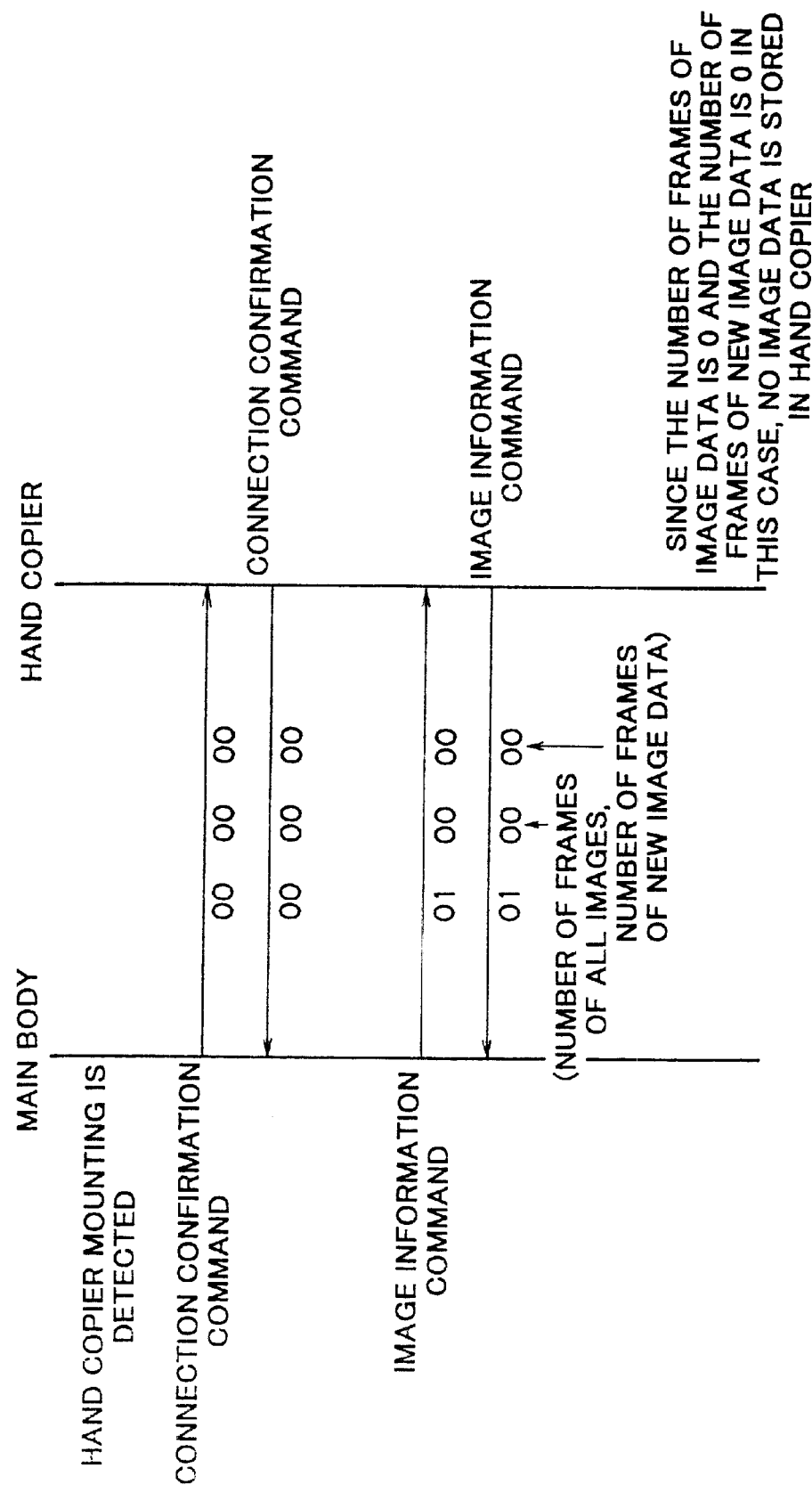
FIG. 9 is a diagram (part 1) showing the sequence of processing of the facsimile apparatus of the present invention.

FIG. 9 shows sequence of processing when no image data is stored in the hand scanner although mounting of the hand scanner is detected. The main body of the apparatus detects the mounting of the hand scanner to send the connection confirmation command to the hand scanner and the hand scanner transmits the connection confirmation command. Then the main body of the apparatus send an image information command to the hand scanner and the hand scanner transmits the image information command.

Figure 10:
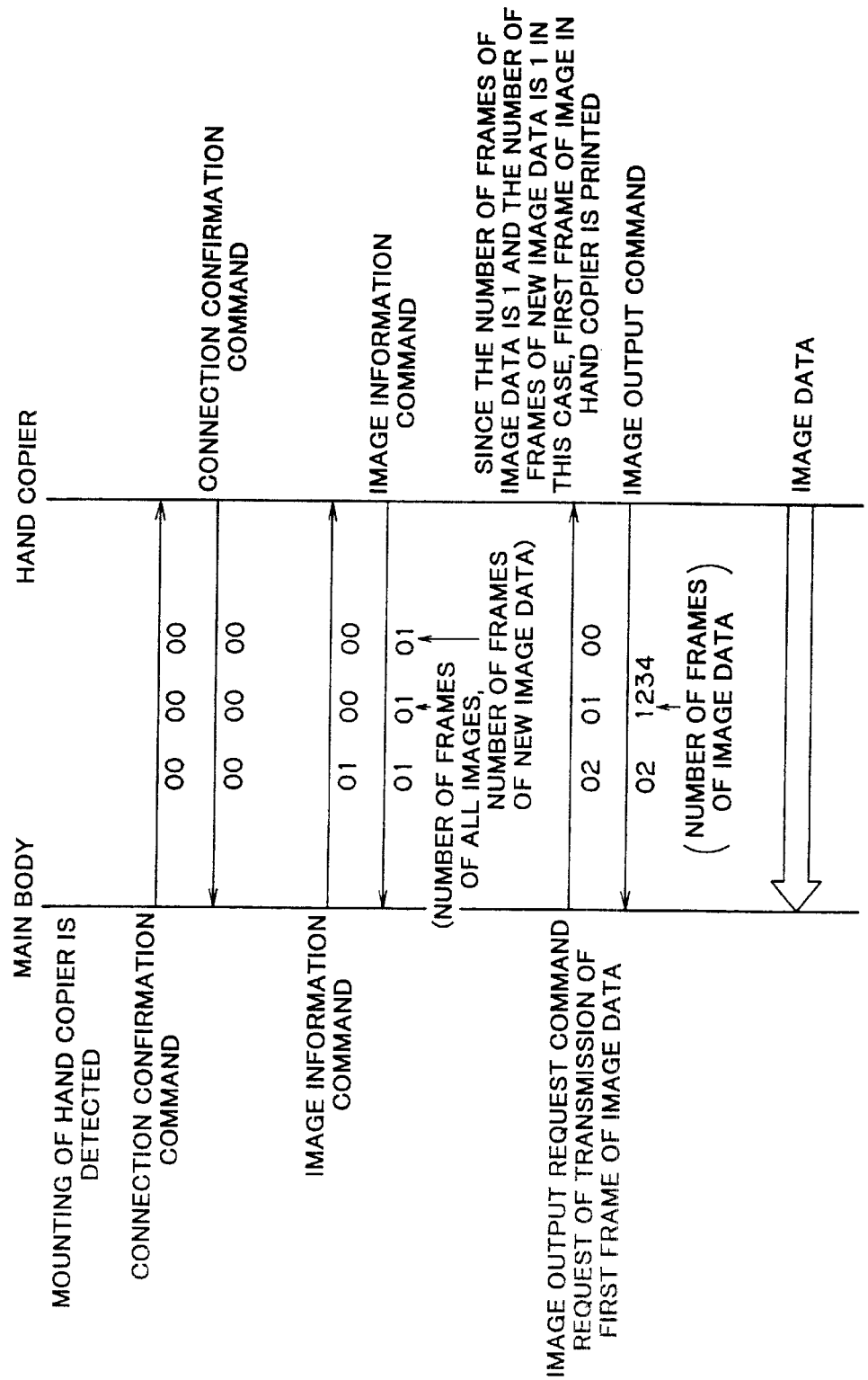
FIG. 10 is a diagram (part 2) showing the sequence of processing of the facsimile apparatus of the present invention.

FIG. 10 shows processing sequence when one frame of new data is stored in the hand scanner. In addition to the processing sequence in FIG. 9, the main body of the apparatus sends an image output request command to the hand scanner and the hand scanner transmits an image output command to the main body of the apparatus.

Figure 11:
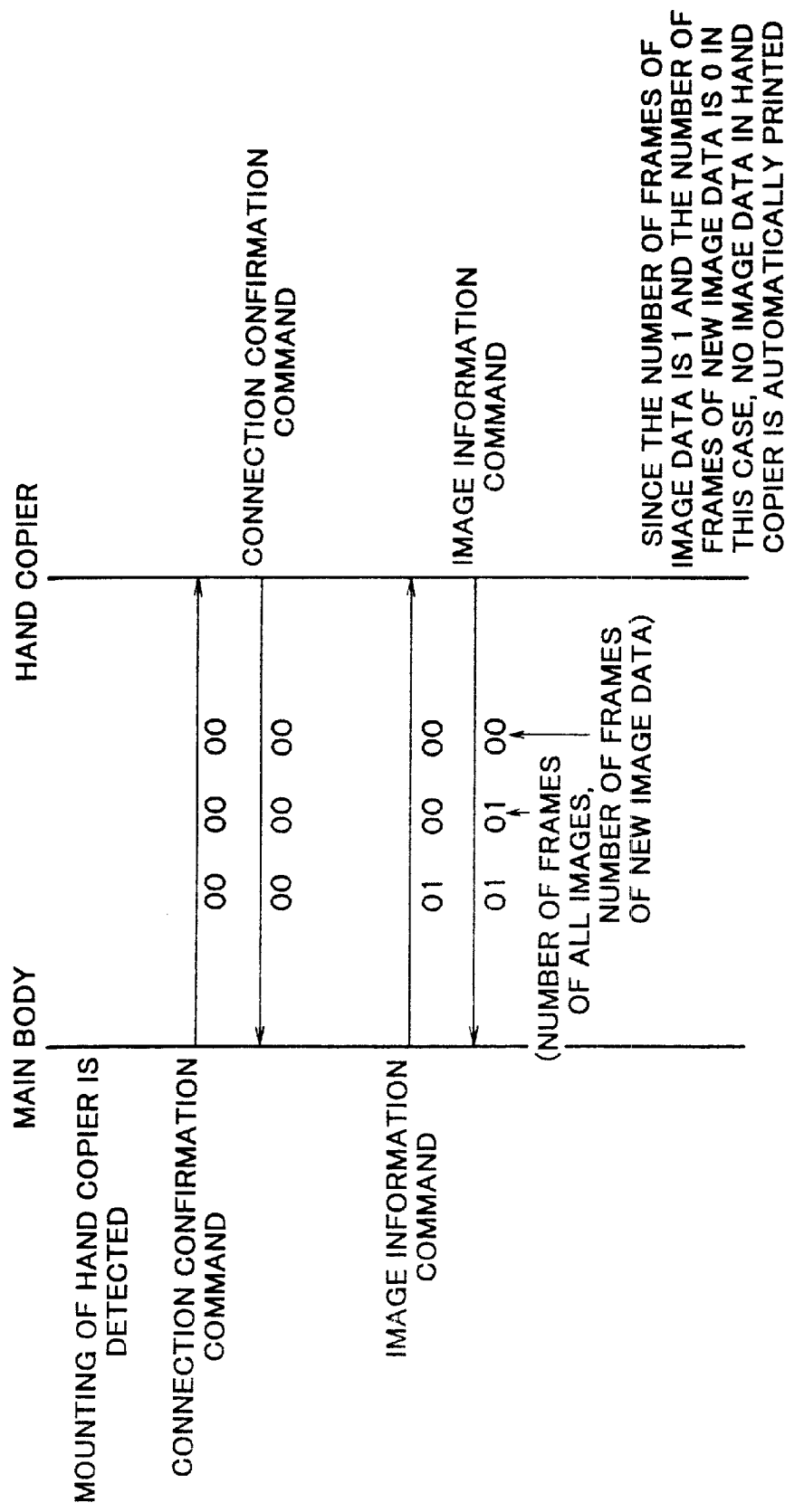
FIG. 11 is a diagram (part 3) showing the sequence of processing of the facsimile apparatus of the present invention.

FIG. 11 shows the processing sequence when total one frame of image data is stored in the hand scanner and the number of the frames of the image data is 0. The sequence is substantially identical with that in FIG. 9 except that the content of the image information command which is transmitted to the main body of the apparatus from the hand scanner is different.

Figure 12:
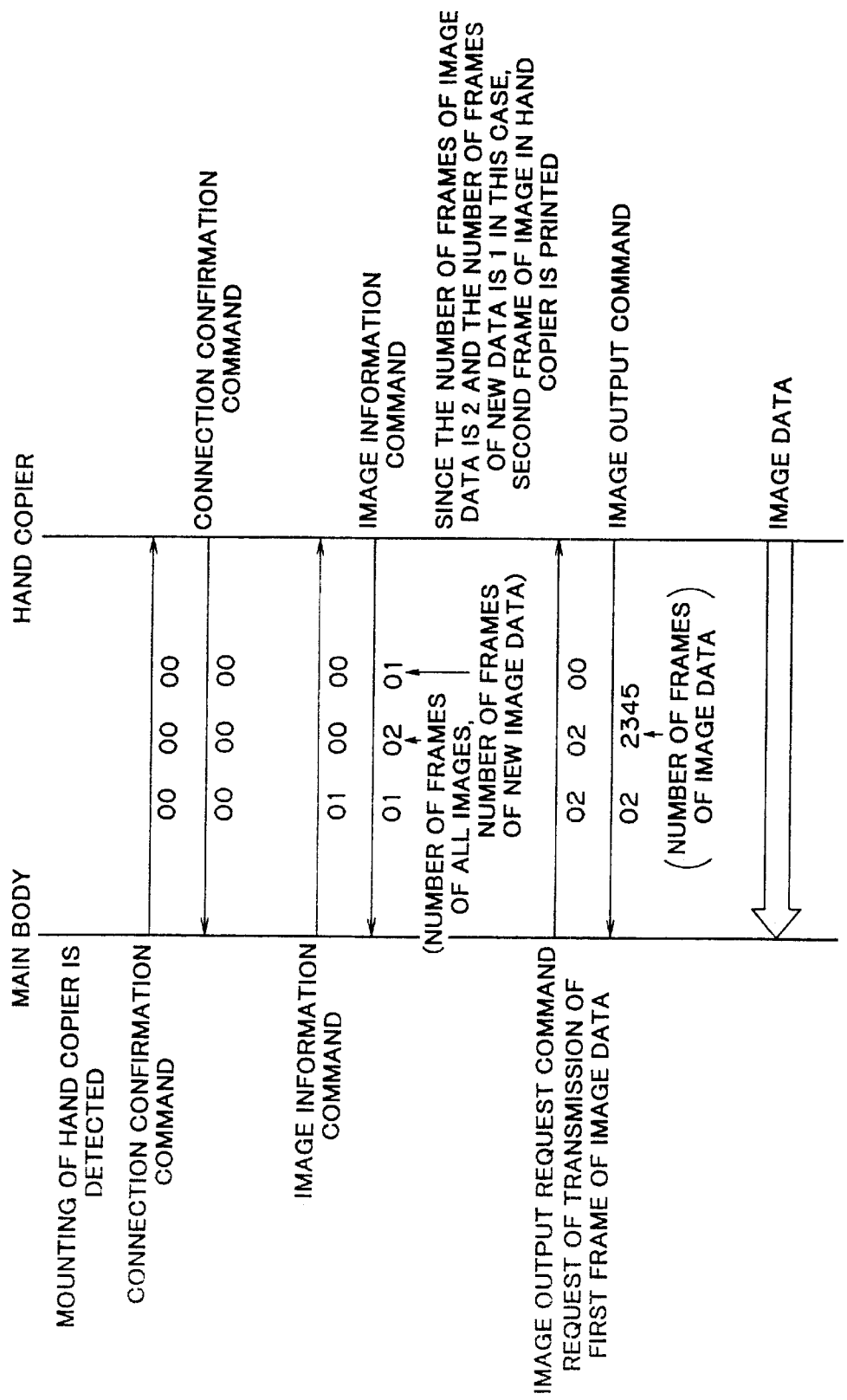
FIG. 12 is a diagram (part 4) showing the sequence of processing of the facsimile apparatus of the present invention.

FIG. 12 shows the processing sequence when one frame of new data is stored in the hand scanner after removing the hand scanner from the condition of FIG. 10. The sequence is substantially identical with that in FIG. 10 except that the content of the image information command and image output command which is transmitted to the main body of the apparatus from the hand scanner and the image output request command which is transmitted to the hand scanner from the main body of the apparatus are different.

Figure 13:
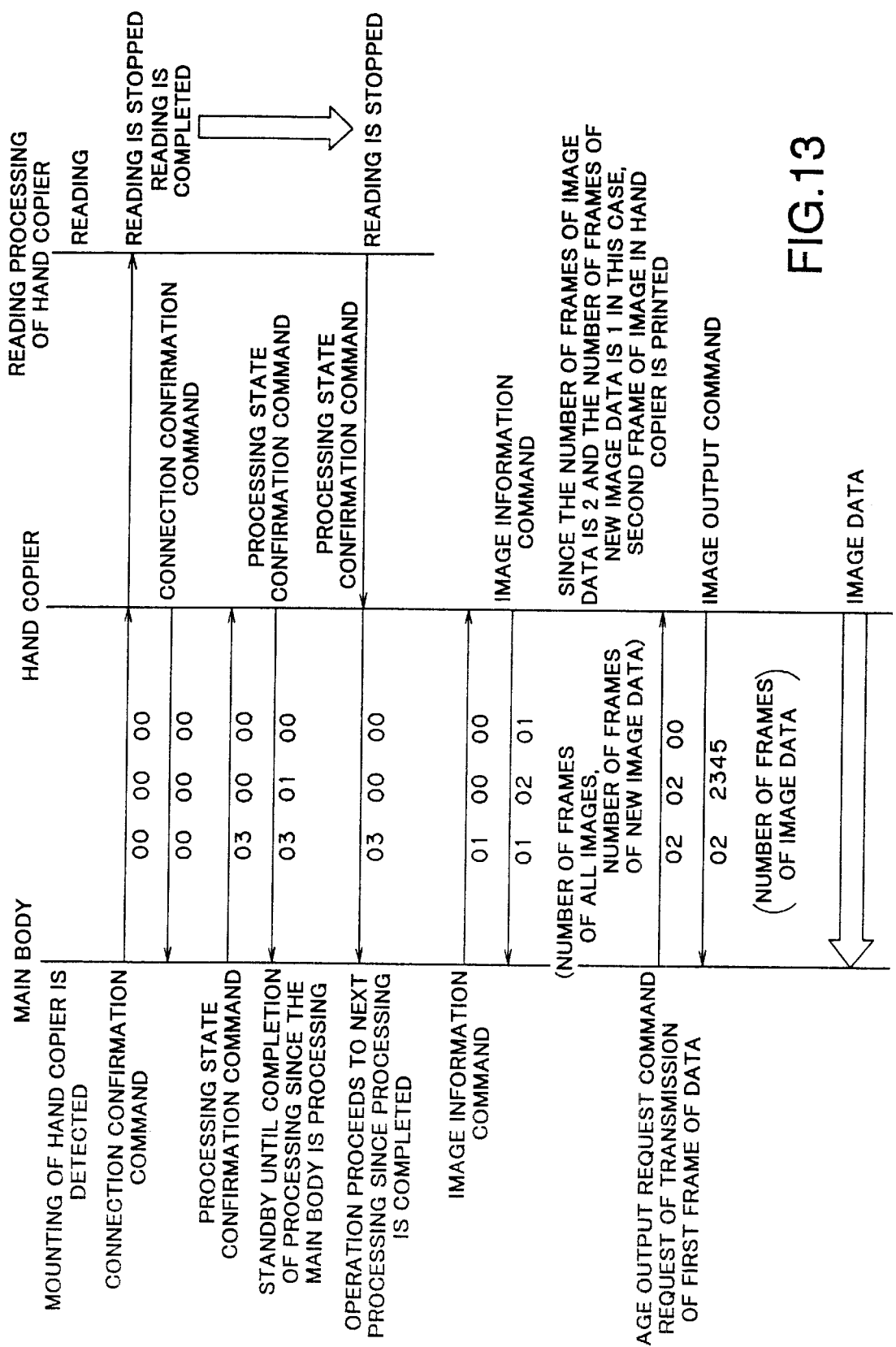
FIG. 13 is a diagram (part 5) showing the sequence of processing of the facsimile apparatus of the present invention.

FIG. 13 shows the processing sequence when a processing state confirmation command is provided in addition to three commands such as connection confirmation command, image information command and image data output command shown in FIGS. 9 to 12.

The reason why this processing state confirmation command is provided is that it is necessary to prevent the image data which is being stored from being transmitted to the main body of the apparatus when the hand scanner is mounted on the main body of the apparatus in the course of reading of an image and to process the image data in the main body of the apparatus after completion of the image reading processing. If the hand scanner receives an image data output request while reading of the image is not completed, the image data is discontinued in the course of reception.

This processing state confirmation command is provided to return the state after the image reading by the hand scanner has been completed. Processing after completion of the image reading by the hand scanner may include storing of the image data, turning off of a reading lamp, which takes an extended period of time. The hand scanner sends a busy signal in response to the processing state confirmation command while the hand scanner is conducting processing after completion of the image reading.

The hand scanner sends a ready command if it completes the above mentioned processing. When the main body of the apparatus detects the ready command, the sequence proceeds to next command.

Storing mode of the storing device 24 for the hand scanner will be described in detail with reference to FIGS. 14 through 19.

The storing device of the hand scanner comprises a storing device having a buffer for storing the number of all frames of data and a buffer for storing the number of frames of new data and n units, each for storing the size of image data and one frame of image data. The storing units for storing the size of image data and image information is formed so that first image information is stored in the first area, the second frame is stored in the second area, . . . , n th frame is stored in n th area, and so on.

A new data is changed into an old data as follows. When image information is read by the hand scanner, the image information is stored in an image information storing area and information on the attribute of the image is stored in the buffer. After completion of reading, the number of frames of all data, the number of frames of new data are increased by one and stored. When it is detected that the hand scanner is removed from the main body of the apparatus, the buffers which store the number of frames of new data are reset to 0.

All the buffers are reset to 0 by initial presetting as shown in FIG. 15.

When the hand scanner is removed from the main body of the apparatus and reading is performed, it is determined that the first frame of data has been read since the number of all frames of all data is 0. The image data and image data size is stored in the storing device for image 1 depending upon respective read data as shown in FIG. 16, and the number of frames of all data and the number of frames of new data are increased by one respectively so that they becomes one.

When reading of image is conducted again by the hand scanner, it is determined that the second frame of image is read since the number of frames of all data is one. The image data and image data size is stored depending upon the data which is read into the storing unit of image 2 as shown in FIG. 17. Since the number of frames of all data and the number of frames of new data are added with 1, they become 2.

When the hand scanner is mounted on the main body of the apparatus, the number of frames of new data is 2 and the number of all data is also 2. Accordingly, image data on the first and second frames are automatically printed as new data.

When the hand scanner is removed from the main body of the apparatus, the number of frames of new data is reset to 0 as shown in FIG. 18. Since the number of frames of new data is 0 even if the hand scanner is mounted on the main body of the apparatus at this time, automatic printing is not performed.

When reading is carried out again by removing the hand scanner from the main body of the apparatus, image data and image data size is stored in an area of the image 3 depending upon the respective read data and the number of frames of all data and the number of frames of new data are added with 1, respectively. Accordingly, the number of frames of all data and the number of frames of new data becomes 3 and 1, respectively.

When the hand scanner is mounted on the main body of the apparatus, the number of frames of all data is 3 and the number of frames of new data is 1. Accordingly, it can be determined that only the last third frame of the image data (image 3) is new data. Only the third frame can be automatically printed.

In accordance with the present invention in a facsimile apparatus including numeric keys for entering dial numbers or abbreviated dial numbers, a transmission instruction key for instructing the processing for transmission, a storage unit for storing dial information and received information, a scanner which is removable from a main body of the apparatus having a reading and storing units, a scanner connecting unit for connecting said scanner to the main body of the apparatus and a printing unit for visually outputting an image data which is stored in said storing unit, the image data which is stored in the storing unit of the scanner is output by only mounting the scanner on the main body of the apparatus. Accordingly, it is not necessary to instruct printing by selecting the image data which an operator read so that ease of operation is enhanced.

In the facsimile apparatus in accordance with the preceding paragraph, the output image data is a data which is obtained since the scanner is removed from the main body of the apparatus until it is mounted thereon in accordance with the present invention. Accordingly, old image data which is previously read is not printed, but only the latest image data is treated resulting in saving of recording paper.

In accordance with the present invention, in a facsimile apparatus including numeric keys for entering dial numbers or abbreviated dial numbers, a transmission instruction key for instructing the processing for transmission, a storage unit for storing dial information and received information, a scanner which is removable from a main body of the apparatus having a reading and storing units, a scanner connecting unit for connecting said scanner to the main body of the apparatus and a printing unit for visually outputting an image data which is stored in said storing unit, reading can be terminated by mounting the scanner on the main body of the apparatus even if the scanner is reading data. No operator's operation is not necessary to terminate reading of the scanner resulting in enhanced ease of operation.

In accordance with the present invention, in a facsimile apparatus including numeric keys for entering dial numbers or abbreviated dial numbers, a transmission instruction key for instructing the processing for transmission, a storage unit for storing dial information and received information, a scanner which is removable from a main body of the apparatus having a reading and storing units, a scanner connecting unit for connecting said scanner to the main body of the apparatus and a printing unit for visually outputting an image data which is stored in said storing unit, the image data which is stored in the storing unit of the scanner is transmitted only by mounting the scanner on the main body of the apparatus. Instruction of transmission by selecting the image data which is read by the operator is not necessary, resulting in enhanced ease of operation.

What is claimed is:

1. A facsimile apparatus comprising:
   a main apparatus body including a processing device, a first storage unit and an output,
   numeric keys for entering dial numbers or abbreviated dial numbers into said first storage unit,
   a scanner adapted for removable physical engagement with said main apparatus body, said scanner having a reading unit for acquiring image data and a second storage unit for storing image data acquired by said reading unit,
   scanner connection/data transfer means for selectively connecting said scanner to said main apparatus body, and for the selective transfer of the image data then contained in said second storage unit from said scanner to said main apparatus body whenever said scanner physically engages said main apparatus body, but not otherwise,
   a printing unit for visually outputting selected acquired image data, and
   a first control unit for detecting whether or not said scanner is connected to said main apparatus body by said scanner connection/data transfer means, for determining whether or not said second storage unit contains new image data acquired since said scanner was last connected to said main apparatus body, and for when said scanner is detected as being connected to said main apparatus body and when said new data is determined to be present in said second storage unit providing control signals for directing said scanner connection/data transfer means to transfer said new image data from said second storage means to said processing means and directing said processing device to process said new image data for transmission to said printing unit for printing.

2. The facsimile apparatus of claim 1, wherein said processing device transmits said processed new image data to an image visualizing device, and/or to said main apparatus body output and/or to said first storage unit.

3. A facsimile apparatus comprising:

a main apparatus body including a processing device, a first storage unit and an output, numeric keys for entering dial numbers or abbreviated dial numbers into said first storage unit, a scanner adapted for removable physical engagement with said main apparatus body, said scanner having a reading unit for acquiring image data and a second storage unit for storing said acquired image data, scanner connection/data transfer means for selectively connecting said scanner to said main apparatus body, and for the selective transfer of the image data contained in said second storage unit to said first storage unit whenever said scanner physically engages said main apparatus body, but not otherwise, a printing unit for visually outputting selected acquired image data, a first control unit for detecting whether or not said scanner is physically connected to said main apparatus body by said connection/data transfer means, for determining whether or not said second storage unit contains new image data acquired since said scanner was last connected to said main apparatus body, and for when said scanner is detected as being connected to said main apparatus body and when new data is determined to be present in said second storage unit providing control signals for directing said scanner connection/data transfer means to transfer said new image data from said second storage unit to said processing device and directing said processing device to process said new image data and to transmit the resulting processed new image data to said printing means for printing, and a second control unit for controlling said scanner, including said reading unit and said second storage unit, and for precluding said reading unit from reading image data during the reception of said new image data by said first storage unit from said second storage unit.

4. The facsimile apparatus of claim 3, wherein said processing device transmits said processed new image data to an image visualizing device, and/or to said main apparatus body output and/or to said first storage unit.

5. A facsimile apparatus comprising:

a main apparatus body including a processing device, a first storage unit and an output, numeric keys for entering dial numbers or abbreviated dial numbers into said first storage unit, a scanner adapted for removable physical engagement with said main apparatus body, said scanner having a reading unit for acquiring image data and a second storage unit for storing said acquired image data, scanner connection/transfer means for selectively connecting said scanner for data transfer to said main apparatus body, a printing unit for visually outputting selected acquired image data, a first control unit for detecting whether or not said scanner is physically connected to said main apparatus body by said connection/data transfer means, for determining whether or not said second storage unit contains new image data acquired since said scanner was last connected to said main apparatus body, and for when said scanner is detected as being connected to said main apparatus body and when said new data is determined to be present in said second storage unit providing control signals for directing said scanner connection/data transfer means to transfer said new image data from said second storage means to said processing device and directing said processing device to process said new image data for transmission to said printing means for printing, and, a second control unit for controlling said scanner, including said reading unit and said second storage unit, such that said scanner independently may read and store image data according to a preselected format only when said scanner is not in physical engagement with said main apparatus body.

6. The facsimile apparatus of claim 5, wherein said processing device transmits said processed new image data to an image visualizing device, and/or to said main apparatus body output and/or to said first storage unit.

7. A facsimile apparatus comprising:

a main body portion including transmission specific input means for inputting image destination data, image data receiving means for receiving image data, first data storage means for storing said image destination data and said image data, data processing means for manipulating said image destination data and said image data, transmission means for transmitting processed image data and first control means for selectively providing control signals to said data processing means and/or said transmission means for the operation thereof;

a scanner portion adapted for removable physical engagement with said main body portion, said scanner portion including an image data reading unit and second data storage means for storing data representative of at least one image read by said reading unit;

connection/transfer means for selectively connecting said second data storage means of said scanner portion to said image data receiving means of said main body portion when said scanner portion physically engages said main body, but not otherwise, and for, upon each connection of said second data storage means to said image data receiving means of said main body portion, transferring to said first data storage means of said main body portion new image data acquired by said second data storage means since its next previous connection to said image data receiving means; and output means connected to said data processing means for visually outputting a processed image derived from said new image data read by said image reading unit in response to control signals from said first control means.

8. A facsimile apparatus according to claim 7, wherein said output means is connected to a printing unit directly associated with said main body and/or to an external device.

9. A facsimile apparatus according to claim 8, wherein said external device is disposed at a location remote from said main body.

10. A facsimile apparatus according to claim 7, wherein said transmission specific input means comprises a code entering device adapted for operation in conjunction with said first control means for outputting said processed image to said printing means and/or to an external device disposed at a remote location via an electrical transmission network.

11. A facsimile apparatus according to claim 10, wherein said electrical transmission network comprises a telephone network.

12. A facsimile apparatus according to claim 7, wherein said first control means provides control signals directing said first storage means and said processing means to receive and process image data from said second storage means whenever said second storage means is connected to said image data receiving means of said main body, but not otherwise.

13. A facsimile apparatus according to claim 7, wherein said scanner precludes the reading of image data by said reading unit during the reception of image data by said first storage means.

14. A facsimile apparatus according to claim 7, wherein said second storage means controls the operation of said scanner such that said scanner independently may read and storage image data according to a preselected format when said scanner is not in physical engagement with said main body.

15. A facsimile apparatus comprising:
  (i) a main apparatus body including:
    an output;
    receiving means for receiving dial numbers and/or image data;
    numeric keys for entering dial numbers or abbreviated dial numbers, a first storage unit for storing dial numbers or abbreviated dial numbers and/or image data received by said receiving means;
    processing means for processing selected ones of said dial numbers and selected image data stored in said first storage means;
    a transmission device; and
    transmission instructing means for instructing said processing means to process selected ones of said dial numbers and selected image data contained in said first storage unit, and for instructing said transmission means to transmit image data 50 processed via said output,
  (ii) a scanner adapted for removable physical engagement with said main body including:
    a reading unit;
    a second storage unit;
    scanner connecting/transmitting means for connecting said scanner for the transmission of data to said main body when said scanner is in physical engagement with said main body, but not otherwise, second output means for connection to said receiving means and for transferring image data acquired by said reading means and stored in said second storage unit between successive connections of said second output means to said receiving means to said receiving means when said scanner is connected to said main body by said scanner connecting/transmitting means;
    a first control unit for detecting whether or not the scanner is in physical engagement with the main body; and
    a second control unit for controlling the scanner, including the reading unit, the second storage unit and the second output means, and
  (iii) a printing unit for visually outputting image data stored in said second storage unit via said first storage unit, said processing means and said output of said main body;
  whereby new image data acquired by said reading means and stored in said second storing unit between a present physical engagement of the scanner with the main apparatus body and the next previous engagement of the scanner with the main apparatus body is visually output by said printing means when said first control unit detects the present physical engagement of said scanner with said main body, but not otherwise.

16. The facsimile apparatus of claim 15, wherein said processing device transmits said processed new image data to an image visualizing device, and/or to said main apparatus body output and/or to said first storage unit.

* * * * *